(12) United States Patent
Jeon

(10) Patent No.: US 8,932,751 B2
(45) Date of Patent: Jan. 13, 2015

(54) RECHARGEABLE BATTERY

(75) Inventor: Yoon-Cheol Jeon, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1534 days.

(21) Appl. No.: 12/071,908

(22) Filed: Feb. 27, 2008

(65) Prior Publication Data

US 2008/0268336 A1    Oct. 30, 2008

(30) Foreign Application Priority Data

Apr. 27, 2007   (KR) .................. 10-2007-0041370

(51) Int. Cl.
*H01M 2/08*    (2006.01)
*H01M 2/02*    (2006.01)

(52) U.S. Cl.
CPC .......... *H03M 2/0408* (2013.01); *H01M 2/0225* (2013.01); *H01M 2/08* (2013.01)
USPC ......................................... 429/182; 429/181

(58) Field of Classification Search
CPC ... H01M 2/08; H01M 8/0276; H01M 8/0284; H01M 8/0286; H01M 8/2485; Y02E 60/12
USPC .................................................. 429/182, 181
See application file for complete search history.

(56) References Cited

U.S. PATENT DOCUMENTS

2007/0015046 A1*   1/2007   Kim et al. ................. 429/53
2007/0154781 A1*   7/2007   Choi ......................... 429/53

FOREIGN PATENT DOCUMENTS

JP    H10-199495 A1     7/1998
KR    10-2007-0007537   1/2007

* cited by examiner

*Primary Examiner* — Mark F Huff
*Assistant Examiner* — Monique Wills
(74) *Attorney, Agent, or Firm* — Robert E. Bushnell, Esq.

(57) ABSTRACT

Disclosed is a rechargeable battery that can improve sealing performance of a gasket and prevent a cap assembly from rotating with respect to a case. The rechargeable battery includes an electrode assembly that includes an anode, a cathode, and a separator interposed between the anode and the cathode, a case that accommodates the electrode assembly, a cap assembly that is coupled with the case to close and seal the case and that has an electrode terminal, and a gasket that is provided between the cap assembly and the case. A protrusion is formed at a surface of the gasket. A ratio of a height of the protrusion to a half-width of the protrusion is about 0.5 to 0.8.

6 Claims, 9 Drawing Sheets

RECHARGEABLE BATTERY

CLAIM OF PRIORITY

This application makes reference to, incorporates the same herein, and claims all benefits accruing under 35 U.S.C. §119 from an application for RECHARGEABLE BATTERY earlier filed in the Korean Intellectual Property Office on the 27th of Apr. 2007 and there duly assigned Serial No. 10-2007-0041370.

BACKGROUND OF THE INVENTION

1. Field of the Invention

The present invention relates to a rechargeable battery. More particularly, the present invention relates to a rechargeable battery having an improved gasket structure.

2. Description of the Related Art

Unlike a primary battery that is incapable of being recharged, a rechargeable battery is a battery that can be repeatedly charged and discharged. A low capacity rechargeable battery having a single cell has been used in small portable electronic apparatuses, such as mobile phones, laptop computers, and camcorders. A high capacity rechargeable battery that includes a plurality of cells connected to each other in a pack is used as a power source of a motor of a hybrid electric vehicle or the like. The rechargeable batteries are manufactured in various shapes, for example a cylindrical shape or a box shape.

The rechargeable batteries are connected in series so as to be used for driving a motor of an electric vehicle, which requires large power, thereby forming a high capacity rechargeable battery module.

A rechargeable battery includes an electrode assembly, in which an anode and a cathode are disposed with a separator interposed therebetween, a case that has a space, which accommodates the electrode assembly, and a cap assembly that closes and seals the case.

When the rechargeable battery has a cylindrical shape, uncoated regions, where an active material is not coated, are formed in the anode and the cathode of the electrode assembly. The anode uncoated region and the cathode uncoated region are disposed to face different directions from each other.

A cathode current collecting plate is attached to the cathode uncoated region, and an anode current collecting plate is attached to the anode uncoated region. The cathode current collecting plate is electrically connected to the case, and the anode current collecting plate is electrically connected to the cap assembly. Accordingly, the case serves as a cathode terminal, and a cap plate provided in the cap assembly serves as an anode terminal.

Therefore, the cap assembly and the case need to be electrically insulated. For this reason, a gasket is provided between the cap assembly and the case.

The anode current collecting plate and the cap assembly are electrically connected to each other by a lead member formed of a conductive metal. The anode current collecting plate and the cap assembly are welded to the lead member and then inserted into the case. After the cap assembly is inserted into the case, the cap assembly is clamped and fixed to the case.

The gasket not only electrically insulates the cap assembly from the case, but seals the case. For this purpose, during a clamping process, uniform pressure is applied to the gasket. However, during the clamping process, it is difficult to apply uniform pressure to the gasket, which causes the case to be inappropriately sealed. As a result, an electrolyte may leak. If the electrolyte leaks, charging and discharging efficiency deteriorates. Further, there is a risk of explosion due to a short circuit. In addition, in the cylindrical battery, since the cap assembly is cylindrical, the cap assembly may rotate with respect to the case. If the cap assembly rotates with respect to the case, a defective electrical contact may occur between the lead member and the cap assembly. The defective electrical contact causes an increase of resistance in a contact portion, which causes heat generation and output power deterioration. When the cap assembly extremely rotates, a welded portion between the lead member and the cap assembly may be separated. In this case, charging and discharging cannot be performed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rechargeable battery including a gasket that does not rotate with respect to a case, having advantages of improving sealing performance.

An exemplary embodiment of the present invention provides a rechargeable battery including an electrode assembly that includes an anode, a cathode, and a separator interposed between the anode and the cathode, a case that accommodates the electrode assembly, a cap assembly that is coupled with the case to close and seal an open top of the case and that has an electrode terminal, and a gasket that is provided between the cap assembly and the case and that has a protrusion formed on its surface. A ratio of a height of the protrusion to a half-width of the protrusion is about 0.5 to 0.8.

The top portion of the protrusion may have a truncated sphere shape. A plurality of protrusions may be formed on the gasket, and may be spaced apart from each other. A difference between azimuth angles of the adjacent protrusions may be about from 2 degrees to 90 degrees.

The protrusion may be a circular rib-shaped protrusion. The protrusion may be formed on an upper surface of the gasket. The protrusion may be formed at a lower surface of the gasket. The protrusion may be formed at a circumferential side surface of the gasket.

Another exemplary embodiment of the present invention provides a rechargeable battery including an electrode assembly that includes an anode, a cathode, and a separator interposed between the anode and the cathode, a case that accommodates the electrode assembly, a cap assembly that is coupled with the case to close and seal an open top of the case and that has an electrode terminal, and a gasket that is provided between the cap assembly and the case and that has a circular rib-shaped protrusion formed at its surface and an anti-rotation protrusion protruding in a width direction of the rib-shaped protrusion.

A ratio of a height of the rib-shaped protrusion to a half-width of the rib-shaped protrusion may be about 0.5 to 0.8. A plurality of anti-rotation protrusions may be formed, and are spaced apart from each other. A difference between azimuth angles of the adjacent anti-rotation protrusions may be about 2 degrees to 90 degrees.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention is described more fully hereinafter with reference to the accompanying drawings, in which embodiments of the present invention are shown. These embodiments are provided so that this disclosure is thorough and will fully convey the scope of the invention to those skilled in the art. The present invention may, however, be embodied in many different forms and should not be construed as limited to the embodiments set forth herein.

Figure 1:
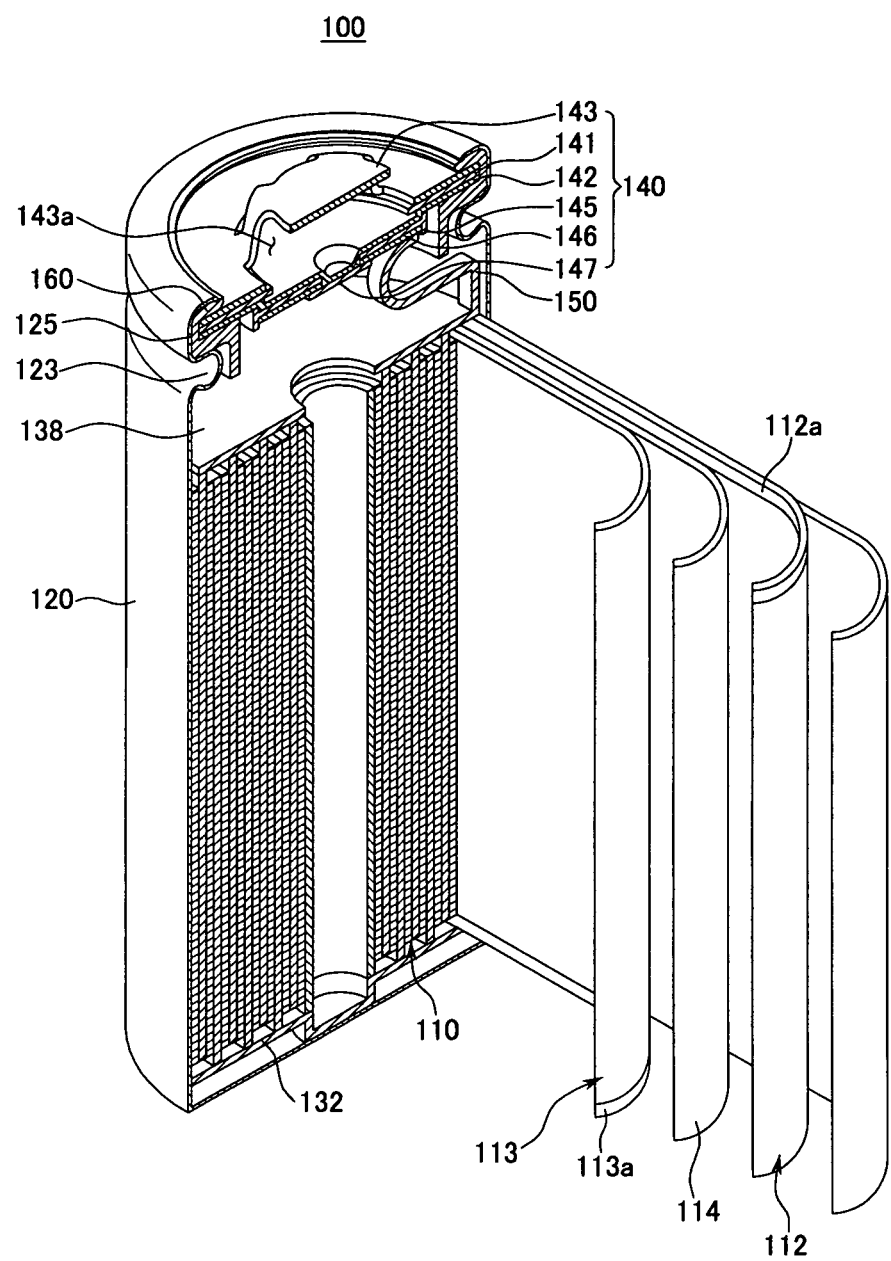
FIG. 1 is a cutout perspective view showing a rechargeable battery constructed as a first exemplary embodiment of the present invention.

FIG. 1 is a cutout perspective view showing a rechargeable battery constructed as an exemplary embodiment of the present invention. Referring to FIG. 1, rechargeable battery 100 of the present exemplary embodiment includes electrode assembly 110 that includes anode 112 and cathode 113 with separator 114 interposed anode 112 and cathode 113, case 120 that has an opening at one end (open top) so as to accommodate electrode assembly 110 together with electrolyte. Cap assembly 140 is provided on the opening of case 120 through gasket 160 to seal the open top of case 120.

Specifically, case 120 is formed of a conductive metal, such as steel plated with aluminum, an aluminum alloy, or nickel.

Case 120 of the present exemplary embodiment has a cylindrical shape having an inner space, in which electrode assembly 110 is disposed. After electrode assembly 110 is inserted into case 120, cap assembly 140 is clamped and fixed to case 120. At this time, bead portion 123 and clamping portion 125 are formed in the portion of case 120 in which cap assembly 140 is clamped and fixed.

In electrode assembly 110 of the present exemplary embodiment, anode 112, separator 114, and cathode 113 are laminated and wound in a vortex shape, thereby forming a cylindrical shape. Electrode assembly 110, however, is not limited to this structure, and it may have a different structure. A center pin (not shown) is provided at the center of electrode assembly 110 such that electrode assembly 110 maintains the cylindrical shape.

An anode uncoated region 112a, where an anode active material is not coated, is formed at an upper end of anode 112, as shown in FIG. 1, so as to be electrically connected to anode current collecting plate 138. Further, cathode uncoated region 113a, where a cathode active material is not coated, is formed at a lower end of cathode 113, as shown in FIG. 1, so as to be electrically connected to cathode current collecting plate 132.

Cap assembly 140 includes cap plate 143 that includes a protruding external terminal and exhaust port 143a, and vent plate 142 that is provided below cap plate 143 and breaks under a predetermined pressure to emit gas. Vent plate 142 blocks electrical connection of electrode assembly 110 and cap plate 143 under the predetermined pressure.

Positive temperature coefficient element 141 is provided between cap plate 143 and vent plate 142. Positive temperature coefficient element 141 is an element that provides infinite electrical resistance when temperature of rechargeable battery 100 is above a predetermined temperature. When the temperature of rechargeable battery 100 becomes a predetermined temperature or higher, positive temperature coefficient element 141 blocks the flow of charge and discharge current.

Vent plate 142 protrudes downward, and sub-plate 147 is attached to a lower surface of the protruding portion of vent plate 142. Middle plate 146 that is fixed to sub-plate 147 is provided at an edge of vent plate 142, and middle plate 146 is electrically connected to electrode assembly 110 through lead portion 150. Insulator 145 is provided between middle plate 146 and vent plate 142 to electrically insulate middle plate 146 from vent plate 142.

Figure 2:
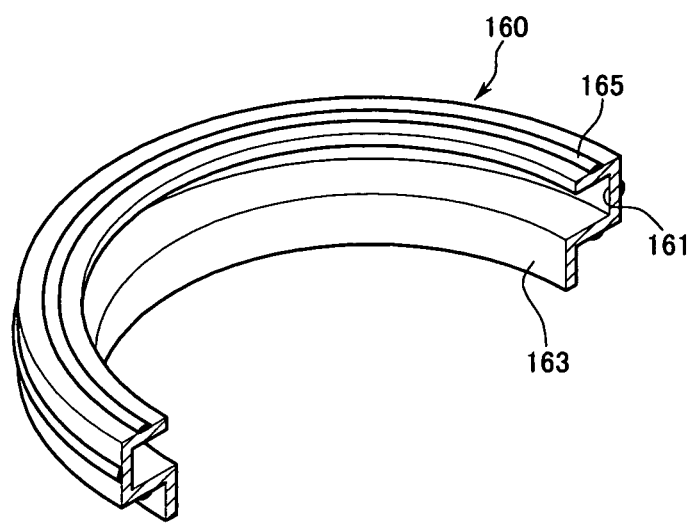
FIG. 2 is a cutout perspective view showing a gasket installed in the rechargeable battery of the first exemplary embodiment of the present invention.

As shown in FIG. 2, in an inner part of gasket 160 of the present exemplary embodiment, groove 161, into which cap assembly 140 is inserted, is formed. Further, tube-shaped blocking portion 163 is formed below groove 161 and extends toward bead portion 123.

Gasket 160 is provided between cap assembly 140 and case 120. Therefore, gasket 160 has a surface that contacts case 120. Herein, a contact surface of gasket 160 is defined as a surface of gasket 160 that contacts case 120. In gasket 160 of the present exemplary embodiment, rib-shaped protrusion 165 is formed at a contact surface of gasket 160. Herein, an upper surface of gasket 160 is a surface facing cap plate 143 or formed towards top direction of case 120. In the same way, a lower surface of gasket 160 is a surface facing electrode assembly 110 or formed towards bottom direction of case 120. A side surface of gasket 160 is a surface that is not the upper and the lower surfaces. Rib-shaped protrusion 165 is formed on an upper contact surface of gasket 160. Further, rib-shaped protrusions 165 can be formed at a side contact surface of gasket 160 along a circumference of the open top of case 120, or can be formed on a lower contact surface of gasket 160. As shown in FIG. 2, rib-shaped protrusion 165 means a continuous protrusion formed along a circumference of a surface of gasket 160.

Since the protrusions are formed in gasket 160, a large contact pressure is applied to protrusion 165 during a clamping process, such that the sealing of the rechargeable battery can be stabilized.

Figure 3:
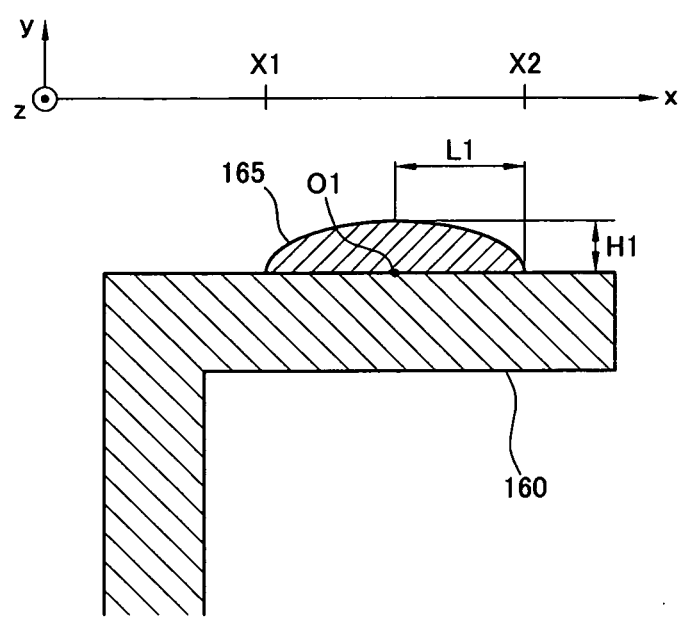
FIG. 3 is a cross-sectional view showing the gasket of the first exemplary embodiment of the present invention.

Herein terminologies are defined in order to describe the shape of the protrusion. The meanings of the terminologies will be used through the descriptions of the present invention and claims. FIG. 3 shows a cross-section of gasket 160 and protrusion 165. A protrusion of a gasket has a base and a top. The base is a surface of the protrusion that contacts a surface of gasket. The top is the farthest point of the protrusion from the base. An edge of the protrusion is a circumference of the base. An edge portion of the protrusion is a side portion of the protrusion around which the protrusion contacts gasket.

Therefore, the edge portion is formed around the edge of the protrusion. The edge portion also can be referred to as a contact portion of the protrusion. Height of the protrusion is defined as a distance between the base and the top of the protrusion. A length direction of the protrusion is defined as a direction formed along a circumference of an open top of a case. For example, the length direction can be an azimuth direction in a polar or cylindrical coordinate system. A width direction is a direction defined on the base, and is perpendicular to the length direction of the protrusion. A width of the protrusion is a distance on the base of the protrusion along the width direction. A half-width of the protrusion is a distance from the center of the base to an edge of the base of the protrusion along the width direction. Therefore, the size of the half-width is substantially a half of the width of the protrusion.

Referring to FIG. 3, a height of protrusion 165 is represented by H1. A length direction is a direction along z-axis (pointing out from the paper). A width direction is a direction along x-axis. A width of protrusion 165 is a distance between edges X1 and X2, and a half-width of protrusion is represented by L1.

As shown in FIG. 3, in protrusion 165, a distance from center O1 to edge X2 in a width direction is represented by L1 (a half-width), and a height is represented by H1. At this time, the ratio of the height to the half-width is about 0.5 to 0.8. In other words, $0.5 \leq H1/L1 \leq 0.8$.

Figure 4:
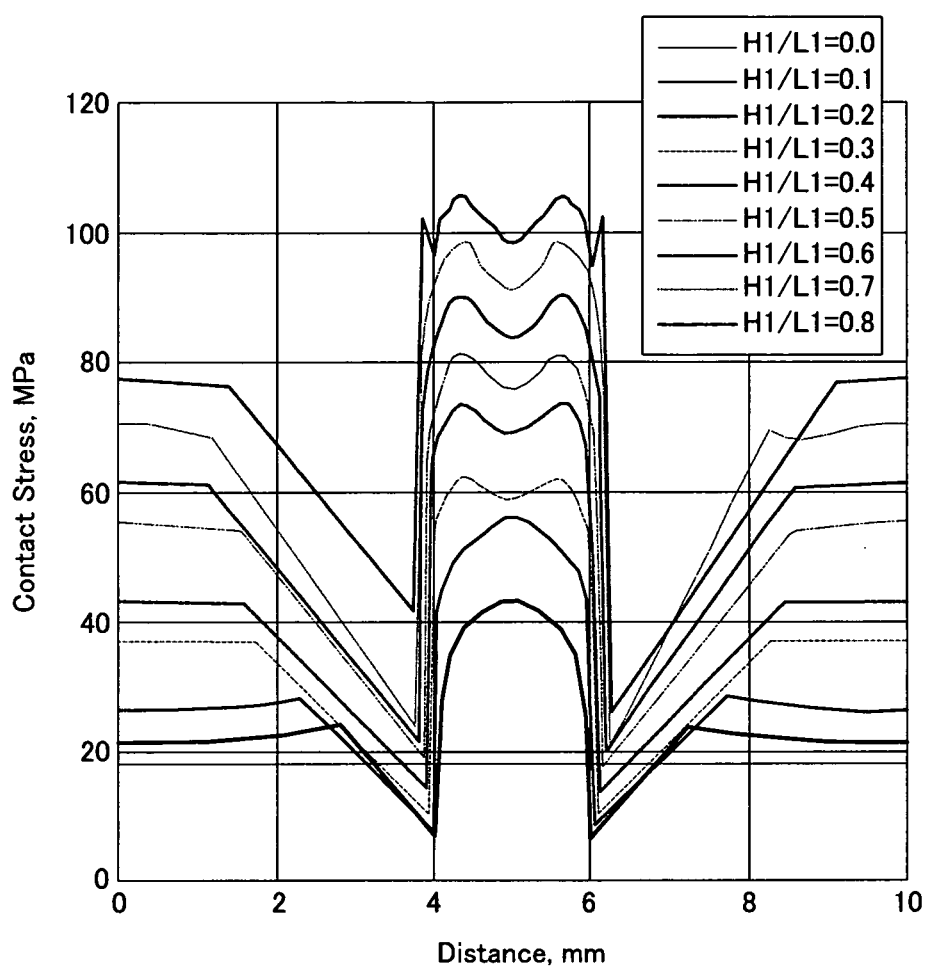
FIG. 4 is a graph showing contact pressure on gaskets of the first exemplary embodiment of the present invention and a comparative example.

FIG. 4 is a graph showing contact pressure on gaskets having protrusions with various ratios of a height to a half-width. The distance is measured along x-axis shown in FIG. 3. In the graph shown in FIG. 4, edges X1 and X2 shown in FIG. 3 approximately corresponds to 4 mm and 6 mm, respectively, in the horizontal axis of the graph.

In the case that protrusion 165 is not formed (H1/L1=0), if gasket 160 is clamped, contact pressure of approximately 20 MPa is uniformly applied to at the surface of gasket 160 and the case 120 (a horizontal line drawn slightly below the scale line of 20 MPa in FIG. 4).

In the case that protrusion 165 having a predetermined height is formed in gasket 160, it is observed that contact pressure is reduced at edges of protrusion 165 (around 4 mm and 6 mm of the horizontal axis of the graph of FIG. 4). The contact pressure has a maximum value at around apex portion of protrusion 165, and a minimum value at the edges of protrusion 165. When the contact pressure at the edge of protrusion 165 is smaller than the contact pressure in a flat portion, that is, 20 MPa, sealing performance may deteriorate at the edge of protrusion 165. In FIG. 4, contact pressure at edges and apex portion increases with the increase of H1/L1. In FIG. 4, when the value of H1/L1 is 0.4 or less, it is shown that the contact pressure at the edge of protrusion 165 is smaller than 20 MPa. That is, only when the value H1/L1 is 0.5 or more, the contact pressure in the vicinity of protrusion 165 becomes larger than the contact pressure in other portions, such that stable sealing performance can be secured.

Referring to FIG. 4, when the value H1/L1 is larger than 0.8 (an uppermost line shown in the graph of FIG. 4), it is observed that the upper surface of protrusion 165 is extremely deformed. If the upper surface of gasket 160 is irregularly deformed, gasket 160 may be permanently deformed or damaged, and thus sealing performance may deteriorate.

According to the present invention, if the value of H1/L1 is in a range of about 0.5 to 0.8, the contact pressure in the vicinity of protrusion 165 can become larger than the contact pressure of the flat portion, and the shape of protrusion 165 can be prevented from being irregularly deformed. Accordingly, the gasket has excellent sealing performance.

Figure 5:
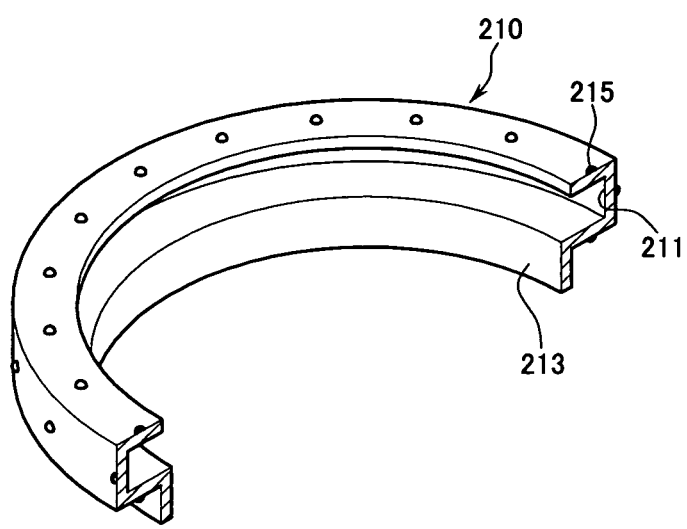
FIG. 5 is a cutout perspective view showing a gasket constructed as a second exemplary embodiment of the present invention.
Figure 6:
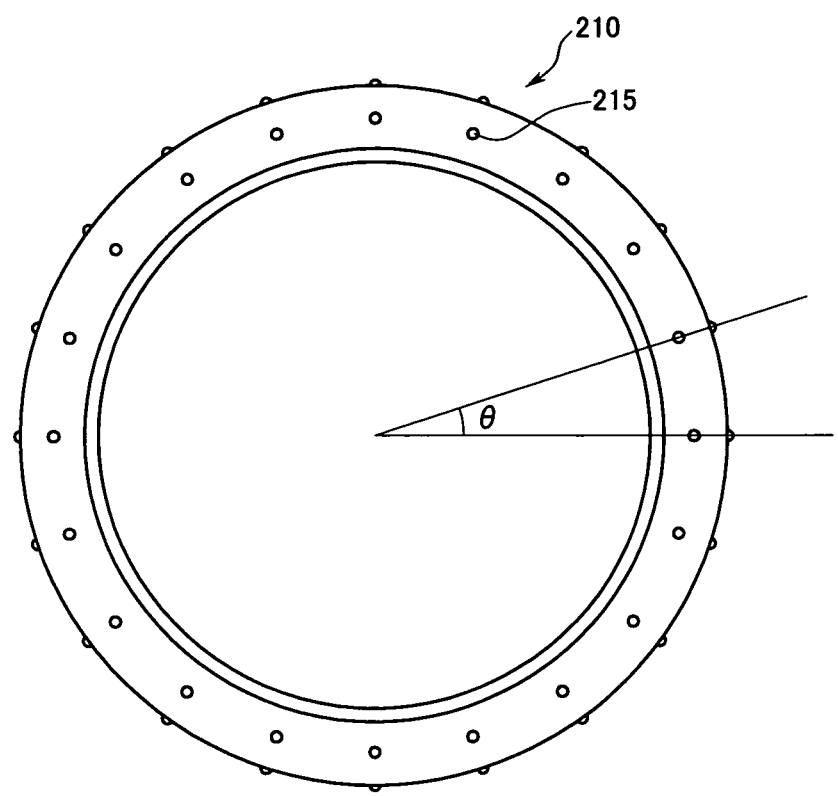
FIG. 6 is a plan view showing the gasket of the second exemplary embodiment of the present invention.

FIG. 5 is a cutout perspective view showing a gasket constructed as a second exemplary embodiment of the present invention, and FIG. 6 is a plan view showing the gasket of the second exemplary embodiment of the present invention. Referring to FIG. 5, gasket 210 of the present exemplary embodiment includes groove 211, into which a cap assembly is inserted, and blocking portion 213 that is formed below groove 211. A plurality of protrusions 215 are formed at the surface of gasket 210. Protrusions 215 are formed at an upper surface, a side circumferential surface, and a lower surface of gasket 210. However, this is just for illustration, and protrusions 215 may be formed in at least one of the upper surface, the lower surface, and the side circumferential surface or combinations thereof.

In the present exemplary embodiment, each of protrusions 215 has a truncated sphere shape. A plurality of protrusions 215 are spaced apart from each other at predetermined intervals along a circumferential direction (azimuth direction). If each of protrusions 215 has the truncated sphere shape, individual protrusions 215 come into contact with the case (not shown), thereby preventing gasket 210 from rotating.

Furthermore, if the height of each of protrusions 215 is set within the same range as the first exemplary embodiment, the contact pressure in the vicinity of protrusions 215 further increases. Accordingly, sealing performance can be prevented from deteriorating due to the protrusions 215. Further, since larger contact pressure is applied in a portion where protrusions 215 are formed, sealing performance is improved.

As shown in FIG. 6, with a given reference line passing a center of gasket 210, an azimuth angle is defined as an angle between the reference line and a line that connects the center of gasket to the protrusion. Therefore, the location of each of protrusions of the second exemplary embodiment of the present invention can be determined by the azimuth angle of the each of protrusions. The interval between two of protrusions 215 can be determined by a difference of the azimuth angles of the two of protrusions 215. When a difference of azimuth angles of the nearest two of protrusions 215 is represented θ, θ is set to satisfy the condition $2° \leq \theta \leq 90°$.

If θ is smaller than 2°, the gap between the protrusions may be too narrow, and sealing performance may be deteriorated. Further, if θ is larger than or the same as 90°, the gap between the protrusions may be too wide, and sealing performance may deteriorates.

Figure 7:
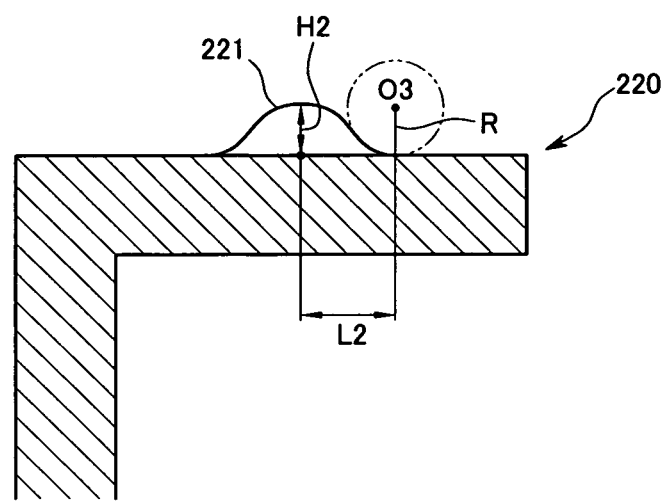
FIG. 7 is a cross-sectional view showing a gasket constructed as a third exemplary embodiment of the present invention.

FIG. 7 is a cross-sectional view showing a gasket constructed as a third exemplary embodiment of the present invention. Referring to FIG. 7, protrusion 221 is formed at the surface of gasket 220 of the present exemplary embodiment. The surface of the top portion of protrusion 221 has a convex shape and edge portions of protrusion 221 has a concave shape. In other words, the surface of the top portion of protrusion 221 can have an arc shape that is drawn about a center that is located inside protrusion 221, and the edge portions of protrusion 221 can have a reverse-arc shape that is drawn about a center that is located outside of protrusion 221. That is, as shown in FIG. 7, the external surface of the contact portion of protrusion 221 and gasket 220, which is an edge portion of protrusion 221, has a reverse-arc shape, which is a part of a circle having a center O3 that is located outside of protrusion 221 and a radius R in a sectional view. When the center of the arc O3 is outside of the protrusion, this arc is defined as a reverse-arc. If the contact portion of the protrusion 221 and the gasket 220 has the arc shape, the contact pressure at the edge of protrusion 221 can be prevented from being reduced. In this configuration, the boundaries of the protrusion and the gasket are smoothly connected to each other, thereby preventing the contact pressure from rapidly deteriorating.

If the height of the protrusion is H2 and the radius of the reverse-arc forming the external surface of the contact portion of the protrusion and the gasket is R and a length from a center to an edge in a width direction is L2, a ratio of the height to the radius (H2/R) preferably satisfies the condition $0.25 \leq H2/R \leq 4$. If the ratio H2/R is smaller than 0.25, the radius R becomes too large, and then the value of H2/L2 becomes too small. If the ratio H2/R is larger than 4, the contact pressure may be slightly reduced, because the radius R is smaller with respect to the height.

Figure 8:
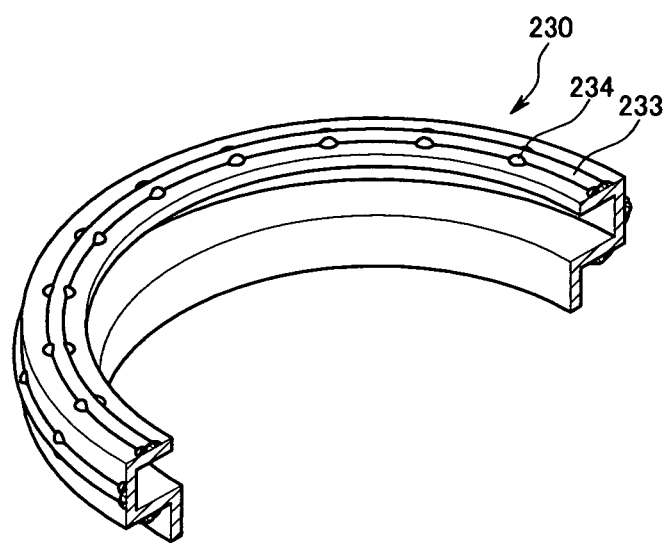
FIG. 8 is a cutout perspective view showing a gasket constructed as a fourth exemplary embodiment of the present invention.
Figure 9:
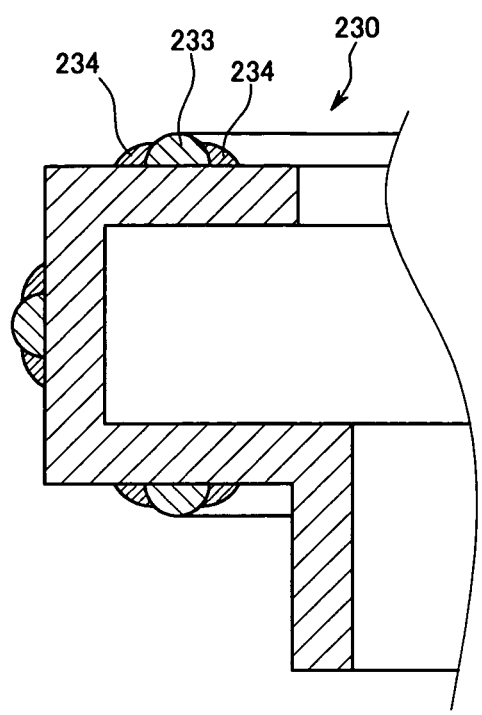
FIG. 9 is a cross-sectional view showing the gasket of the fourth exemplary embodiment of the present invention.

FIG. 8 is a cutout perspective view showing a gasket constructed as a fourth exemplary embodiment of the present invention, and FIG. 9 is a cross-sectional view showing the gasket of the fourth exemplary embodiment of the present invention.

Referring to FIGS. 8 and 9, in gasket 230 of this exemplary embodiment, rib-shaped protrusions 233 are formed at the upper surface, at the lower surface, and at the circumferential side surface. In each of the rib-shaped protrusions 233, anti-rotation protrusions 234 are formed to protrude towards a width direction of rib-shaped protrusion 233.

Each of protrusions 233 extends to form a loop on the surface of gasket. In the present exemplary embodiment, in a gasket that is applied to a cylindrical battery, protrusion 233 may have a circular shape.

Each of anti-rotation protrusions 234 is formed to have a height smaller than the height of rib-shaped protrusion 233, and to be spaced at a predetermined gap from adjacent anti-rotation protrusions 234.

If the anti-rotation protrusions 234 are formed in rib-shaped protrusion 233, a stable seal can be produced with rib-shaped protrusion 233. Furthermore, since a frictional force between gasket 230 and the case (not shown) increases due to anti-rotation protrusions 234, gasket 230 can be prevented from rotating.

As described above, according to the exemplary embodiments of the present invention, since the protrusion formed in the gasket has a predetermined height, the contact pressure at the edge of the protrusion becomes larger than the contact pressure in other portions. Therefore, stable sealing can be performed.

Furthermore, since the rib-shaped protrusion and the anti-rotation protrusions are formed, stable sealing can be performed and the gasket can be prevented from rotating. Therefore, structural stability of the rechargeable battery can be improved.

In addition, since the edge of the protrusion has a smooth arc shape, the reduction in contact pressure can be minimized. Therefore, structural stability of the rechargeable battery can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
    an electrode assembly that includes an anode, a cathode, and a separator interposed between the anode and the cathode;
    a case accommodating the electrode assembly, the case having an open top;
    a cap assembly coupled with the case to close and seal the open top of the case, the cap assembly having an electrode terminal;
    a gasket provided between the cap assembly and the case,
    a rib-shaped protrusion formed on a surface of the gasket along a circumference of the open top of the case, the rib-shaped protrusion contacting the case; and
    an anti-rotation protrusion formed on the rib-shaped protrusion, the anti-rotation protrusion protruding in a width direction of the rib-shaped protrusion from the rib-shaped protrusion.

2. The rechargeable battery of claim 1, wherein a ratio of a height of the rib-shaped protrusion to a half-width of the rib-shaped protrusion is about 0.5 to 0.8.

3. The rechargeable battery of claim 1, wherein at least two anti-rotation protrusions are formed on the surface of the gasket, the anti-rotation protrusions being spaced apart from each other.

4. The rechargeable battery of claim 1, wherein a difference between azimuth angles of the adjacent anti-rotation protrusions is about 2 degrees to 90 degrees.

5. The rechargeable battery of claim 1, wherein an contact portion of the anti-rotation protrusion to the gasket has a reverse-arc shape.

6. The rechargeable battery of claim 5, wherein a ratio of a height of the anti-rotation protrusion to a radius of the reverse-arc of the contact portion of the anti-rotation protrusion is about from 0.25 to 4.

* * * * *